(12) United States Patent
Schicke (10) Patent No.: US 6,918,863 B2
(45) Date of Patent: Jul. 19, 2005

(54) METHOD OF AND APPARATUS FOR REPLACING CUTTING IMPLEMENTS IN SEVERING MACHINES

(75) Inventor: Joachim Schicke, Wentorf (DE)

(73) Assignee: Hauni Maschinenbau AG, Hamburg (DE)

( * ) Notice: Subject to any disclaimer, the term of this patent is extended or adjusted under 35 U.S.C. 154(b) by 108 days.

(21) Appl. No.: 10/038,575

(22) Filed: Jan. 8, 2002

(65) Prior Publication Data

US 2002/0052271 A1 May 2, 2002

(30) Foreign Application Priority Data

Jan. 8, 2001 (DE) .......................................... 101 00 464

(51) Int. Cl.[7] .............................................. B23Q 3/155
(52) U.S. Cl. .............................. 483/1; 483/31; 483/57; 83/310
(58) Field of Search ................................ 29/33 R, 809, 29/650; 483/1, 30, 31, 13, 57; 131/84.4; 83/310, 594, 632, 628

(56) References Cited

U.S. PATENT DOCUMENTS

| | | | |
|---|---|---|---|
| 975,563 A | * | 11/1910 | Morgan ........................ 29/809 |
| 3,140,632 A | | 7/1964 | Rowlands et al. |
| 3,476,002 A | | 11/1969 | Bardenhagen et al. |
| 3,815,460 A | | 6/1974 | Bardenhagen |
| 3,830,126 A | | 8/1974 | Ringe |
| 4,281,670 A | | 8/1981 | Heitmann et al. |
| 4,412,505 A | | 11/1983 | Hauesler et al. |
| 4,478,231 A | * | 10/1984 | Rudszinat ................... 131/84.4 |
| 5,217,424 A | * | 6/1993 | Pallmann ........................ 483/1 |
| 5,417,637 A | | 5/1995 | Ninomiya |
| 5,444,904 A | | 8/1995 | Kokko |
| 5,637,068 A | * | 6/1997 | Chambers ....................... 483/1 |
| 5,725,464 A | * | 3/1998 | Pallmann ........................ 483/1 |

FOREIGN PATENT DOCUMENTS

| | | |
|---|---|---|
| DE | 26 56 003 A1 | 10/1977 |
| DE | 3835314 | 5/2000 |

\* cited by examiner

*Primary Examiner*—A. L. Wellington
*Assistant Examiner*—Dana Ross
(74) *Attorney, Agent, or Firm*—Venable LLP; Robert Kinberg; Chad C. Anderson (57) ABSTRACT

Apparatus for replacing spent and/or damaged knives with fresh knives in a machine wherein semifinished rod-shaped smokers' products are converted into cigarettes, filter mouthpieces or the like employs a knife holder, a locking device which can releasably clamp a knife in the holder, a preferably automated system for temporarily deactivating the locking device in order to allow for removal of a spent knife, and a conveyor system for introduction of a fresh knife into the holder subsequent to removal of the spent knife and prior to renewed activation of the locking device.

32 Claims, 3 Drawing Sheets

METHOD OF AND APPARATUS FOR REPLACING CUTTING IMPLEMENTS IN SEVERING MACHINES

CROSS-REFERENCE TO RELATED CASES

The present application claims the priority of the commonly owned copending German patent application Serial No. 101 00 464.8 filed Jan. 8, 2001. The disclosure of the aforementioned priority application identified in the specification of the present application are incorporated herein by reference.

BACKGROUND OF THE INVENTION

The invention relates to improvements in cutting or subdividing apparatus which employ replaceable cutting implements (hereinafter called knives for short). More particularly, the invention relates to methods of and to apparatus for replacing worn, otherwise damaged and/or improperly selected knives which are utilized to sever or subdivide partly finished (intermediate) products of the tobacco processing industry. Examples of such intermediate products are continuous cigarette, cigar, cigarillo or other tobacco-containing rods and continuous rods containing fillers of filter material for tobacco smoke, tubes and other products which must be severed to respectively yield plain cigarettes, filter mouthpieces or other products of unit length or multiple unit length.

A cigarette making machine is designed to turn out at least one continuous rod-like product wherein a tubular wrapper of cigarette paper surrounds a rod-like filler of shredded and/or otherwise comminuted tobacco leaves and/or other smokable material. The apparatus (known as cutoff) which is utilized to subdivide the continuous rod-like product into a file of discrete cigarettes of desired length comprises one or more knives which severs or sever the rod-like product while advancing at the speed and in the direction of movement of the rod as well as sideways across the path for the rod.

The quality of cuts across a continuously advancing cigarette rod is of considerable importance to the ultimate user because at least one end of the finished cigarette is visible. Therefore, the cutting edge(s) of the knife or knives which is or which are used to subdivide a cigarette rod is or are continuously sharpened whenever the cutoff is in use. This results in pronounced wear upon the knives, and such wear develops in addition to that which is attributable to sliding movement relative to the advancing rod in actual use of the cigarette maker. It is to be borne in mind that, in a modern cigarette making machine (e.g., that known as PROTOS 2 and distributed by the assignee of the present application), a knife must carry out several thousand cuts per minute. The wear upon the knives is so pronounced that the cutoff must receive a new knife every eight hours or so.

At the present time, the removal of used knives and their replacement with fresh (new) knives are carried out by the attendants in the cigarette making plant. This is a time-consuming operation, especially in a plant wherein several hundred machines are employed to simultaneously turn out huge quantities of plain cigarettes of desired length. The situation is analogous in numerous plants which turn out continuous filter rods, continuous tubes intended to be subdivided into shorter tubes for use in certain types of smokers' products, cigarillo rods and many other rod-shaped intermediate (i.e., semifinished) products.

OBJECTS OF THE INVENTION

An object of the present invention is to provide a novel and improved method which renders it possible to operate a cigarette maker or an analogous machine (such as a filter rod making machine) with considerable savings in man-hours.

Another object of the invention is to provide a method which eliminates the need for manual replacement of spent and/or damaged and/or otherwise unsatisfactory knives in cigarette makers and analogous machines with fresh knives.

A further object of the instant invention is to provide a method which renders it possible to replace a spent knife in a cigarette maker or an analogous machine within a minute fraction of time which is necessary to perform such work in accordance with presently known proposals.

An additional object of the invention is to provide a novel and improved method of manipulating spent knives and new knives in cigarette makers and analogous machines which are designed to turn out continuous smokers' products.

Still another object of the present invention is to provide a novel and improved apparatus for the practice of the above outlined method.

A further object of this invention is to provide an apparatus which can be automated to any desired extent in a simple, time-saving and inexpensive but highly reliable manner.

Another object of the invention is to provide an apparatus which can be installed in or combined with existing machines serving to turn out cigarette rods, filter rods, cigarillo rods and analogous intermediate products of the tobacco processing industry.

An additional object of the invention is to provide a novel and improved cutoff for use in cigarette makers and like or analogous machines.

Still another object of the invention is to provide novel and improved knife manipulating devices and groups of devices for use in the above outlined apparatus and/or machines.

A further object of this invention is to provide a cigarette making, a cigar making, a filter rod making or an analogous machine which embodies or which is combinable with an apparatus of the above outlined character.

SUMMARY OF THE INVENTION

One feature of the present invention resides in the provision of a method of replacing an at least partially spent first knife (e.g., a knife which has undergone extensive wear), which is locked in the knife holder of a severing unit (such as a cutoff) that is operative to sever smokers' products, with a second knife (e.g., with a new or fresh knife). The improved method comprises the steps of automatically unlocking the first knife so that it is ready to be withdrawn or otherwise removed from the knife holder, removing the first knife from the holder, and introducing the second knife into the holder. The removing and/or the introducing step, too, can be performed by resorting to automatic equipment, and such automation of the severing unit can be effected in addition to or in lieu of automation of the unlocking step.

The improved method can further comprise the step of engaging the first knife prior to the removing step, e.g., of clamping the first knife by tongs or other suitable implements while the first knife is still held in and biased and/or otherwise urged against the knife holder. The removing step of such method can include advancing the first knife along an at least substantially straight path, and such method can further comprise the step of delivering the removed first knife to and releasing the first knife at a disposing station for spent knives. The engaging step of the just discussed method can be carried out prior to the unlocking step, and the removing step can include grasping the cutting edge or one of several cutting edges of the first knife.

The method can further comprise the step of moving the first knife to a predetermined position relative to the knife holder subsequent to the unlocking step and prior to completion of the removing step. The latter can include placing a withdrawing unit for the first knife opposite the first knife not later than when the first knife occupies the predetermined position.

The method can further comprise the step of interrupting the operation of the severing unit at least in the course of the removing step, and the step of maintaining the first knife at least close to a predetermined position at the time of initiation of the removing step. The removing step of such method can include placing a withdrawing unit for the first knife opposite the first knife not later than when the first knife occupies the predetermined position.

If the method is being resorted to for replacement of a first knife which is subject to wear during operation of the severing unit, it can further comprise the steps of monitoring (e.g., optically and/or otherwise) the extent of wear upon the first knife during operation of the severing unit and initiating the removing step when the wear upon the first knife reaches a predetermined value.

Still further, the method can comprise the step of automatically locking the second knife in the knife holder upon completion of the introducing step.

The method can also comprise the steps of withdrawing the second knife from a storage facility for second knives and conveying the thus withdrawn second knife to a preselected position prior to the introducing step. The conveying step of such method can include moving the second knife along an at least partially linear path or along an at least substantially linear path, and such method can further comprise the step of transporting the knife holder to a position opposite the preselected position of the second knife prior to the introducing step.

The operation of the severing unit can include or includes moving the knife holder, and such method can further comprise the step of interrupting the step of moving the knife holder preparatory to and in the course of the introducing step. Still further, such method can comprise the steps of withdrawing the second knife from the aforementioned or from another storage facility, conveying the thus withdrawn second knife to a preselected position prior to the introducing step, and transporting the knife holder to a position opposite the second knife in the preselected position of the second knife.

The method can further comprise the step of locking the second knife upon completion of the introducing step and/or the step of maintaining, at the time of initiation of the removing step, the knife holder at least close to a predetermined position in which the second knife can be introduced into the knife holder upon completion of the removing step.

The method can include the step of automatically carrying out the removing and/or the introducing step; such step of automatically carrying out at least one of the removing and introducing steps can be performed by utilizing a computer. Furthermore, the aforementioned step of automatically locking the second knife in the knife holder upon completion of the introducing step can be automated.

All in all, the heretofore discussed novel method can comprise the step of automatically carrying out at least one of the following additional steps (the following listing of such steps is not exhaustive, i.e., the method can include one or more steps which can be utilized in lieu of or in addition to the listed steps):

Engaging the first knife prior to the removing step;

delivering the removed first knife to a disposing station for first knives (e.g., to a scrap collecting station);

moving the first knife to a predetermined position relative to the knife holder subsequent to the unlocking step and prior to completion of the removing step;

interrupting the operation of the severing unit at least in the course of the removing step;

maintaining the first knife at least close to a predetermined position at the time of initiation of the removing step;

monitoring the extent of wear upon the first knife during operation of the severing unit;

initiating the removing step when the wear upon the first knife reaches a predetermined value;

locking the second knife in the holder upon completion of the introducing step;

withdrawing the second knife from the aforementioned or another storage facility for second knives;

conveying the withdrawn second knife to a predetermined position prior to introduction of the second knife into the holder;

transporting the knife holder to a position opposite a preselected position of the second knife prior to the introducing step;

moving the knife holder during operation of the severing unit;

interrupting the movement of the knife holder preparatory to and in the course of the introducing step; and maintaining—at the time of initiation of the removing step—the knife holder at least close to a predetermined position in which the second knife can be introduced into the knife holder upon completion of the removing step.

A modified method involves the removal of a knife which is locked in the knife holder of a severing unit that is operative to sever smokers' products. This method comprises the steps of automatically unlocking the knife, and removing the unlocked knife from the knife holder. Such method can further comprise the step of replacing the removed knife with a second knife. At least one of the removing and replacing steps can include advancing the respective knife along an at least substantially linear path or along a path which includes at least one linear portion, e.g., along a straight horizontal path.

A third method involves the introduction of a knife into the knife holder of a severing unit which is operative to sever smokers' products or the like. This method comprises the steps of conveying the knife into the knife holder, and automatically locking the conveyed knife in the knife holder. Such method can further comprise the step of removing a spent knife from the knife holder prior to the conveying step.

Another feature of the present invention resides in the provision of an apparatus for replacing a first knife, which is locked in the knife holder of a severing unit in a machine for severing partly finished smokers' products, with a second knife. The improved apparatus comprises disengageable means for locking the first knife in the holder, means for disengaging the locking means, means for removing the first knife from the knife holder upon completed disengagement of the locking means, and means for introducing the second knife into the knife holder upon removal of the first knife and prior to re-engagement of the locking means.

The locking means can comprise a biasing member (e.g., at least one roller) that is movable between first and second positions in which a knife is respectively locked in and removable from the knife holder, and the disengaging means of the apparatus can include a displacing member as well as means for moving the displacing member relative to the knife holder to thus move the biasing member from the first position to the second position, at least during removal of the first knife from the knife holder. The displacing member can include a reciprocable bolt, and the removing means can include means for clamping the first knife at least during removal of such knife from the knife holder. Such clamping means can be arranged to clamp the cutting edge of the first knife during removal of this knife from the knife holder.

The removing means can further comprise means for moving the clamping means and the first knife along an at least partially linear path which extends away from the knife holder.

The improved apparatus can further comprise means for engaging the locking means upon introduction of the second knife into the knife holder; such engaging means can include the disengaging means or vice versa.

If the locking means comprises the aforementioned biasing member, the apparatus can further comprise means for moving the biasing member between its aforementioned first and second positions and means for conveying the second knife into the knife holder in the second position of the biasing member and upon removal of the first knife from the knife holder. Such apparatus can further comprise a storage facility for a supply of second knives, and the conveying means of such apparatus is then arranged to move discrete second knives seriatim from the storage facility to the knife holder. Such conveying means can comprise driven rollers which are arranged to advance second knives from the storage facility to the knife holder. The storage facility can comprise resilient means for biasing second knives of the supply of second knives in the storage facility against each other.

The disengaging means can include means for releasably locking a second knife in the knife holder upon introduction of such second knife into the holder.

A modified apparatus can be utilized for the withdrawal of an at least partially used and/or damaged knife which is lockingly engaged by the knife holder of a machine for severing partly finished smokers' products. This apparatus comprises means for terminating the locking engagement between the knife and the holder, and means for removing the knife from the knife holder upon termination of the locking engagement. Such apparatus can further comprise means for introducing a fresh knife into the knife holder upon removal of the at least partially used and/or damaged knife.

A further apparatus can be utilized for insertion of a knife into the knife holder of a machine for severing partly finished smokers' products. This apparatus comprises means for releasably locking knives in the holder, means for disengaging the locking means, and means for conveying discrete knives into the knife holder in the disengaged condition of the locking means. This apparatus preferably further comprises a source of knives and its conveying means is or can be arranged to transport discrete knives from the source to the knife holder. The locking means can comprise means for clamping knives to the knife holder.

The novel features which are considered as characteristic of the invention are set forth in particular in the appended claims. The improved apparatus itself, however, both as to its construction and the modes of assembling and operating the same, together with numerous additional important and advantageous features and attributes thereof, will be best understood upon perusal of the following detailed description of certain presently preferred specific embodiments with reference to the accompanying drawing.

DESCRIPTION OF PREFERRED EMBODIMENTS

Figure 1:
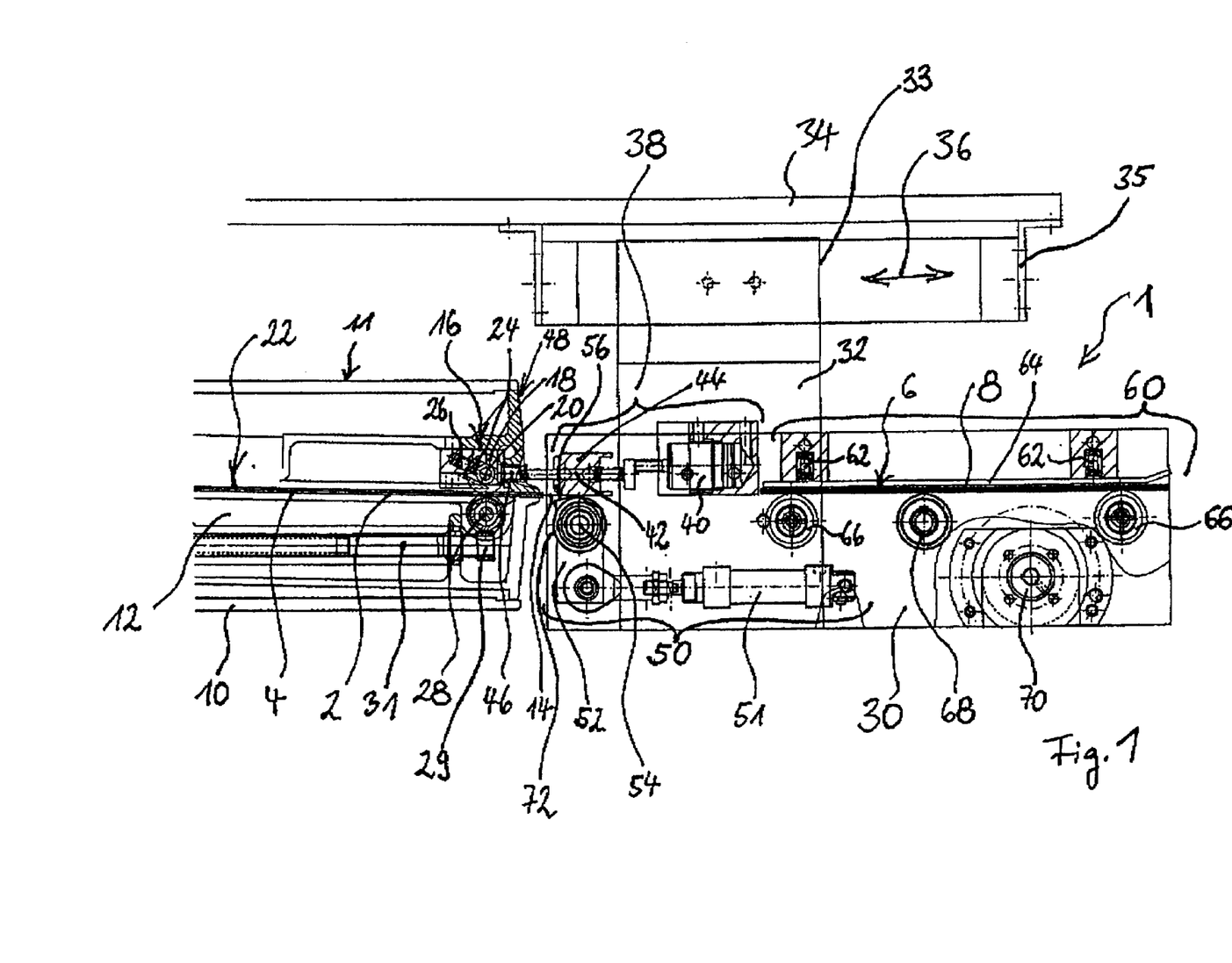
FIG. 1 is a partly plan and partly horizontal sectional view of an apparatus which is arranged to at least partly automatically replace spent knives with fresh knives in the cutoff of a cigarette making machine.
Figure 2:
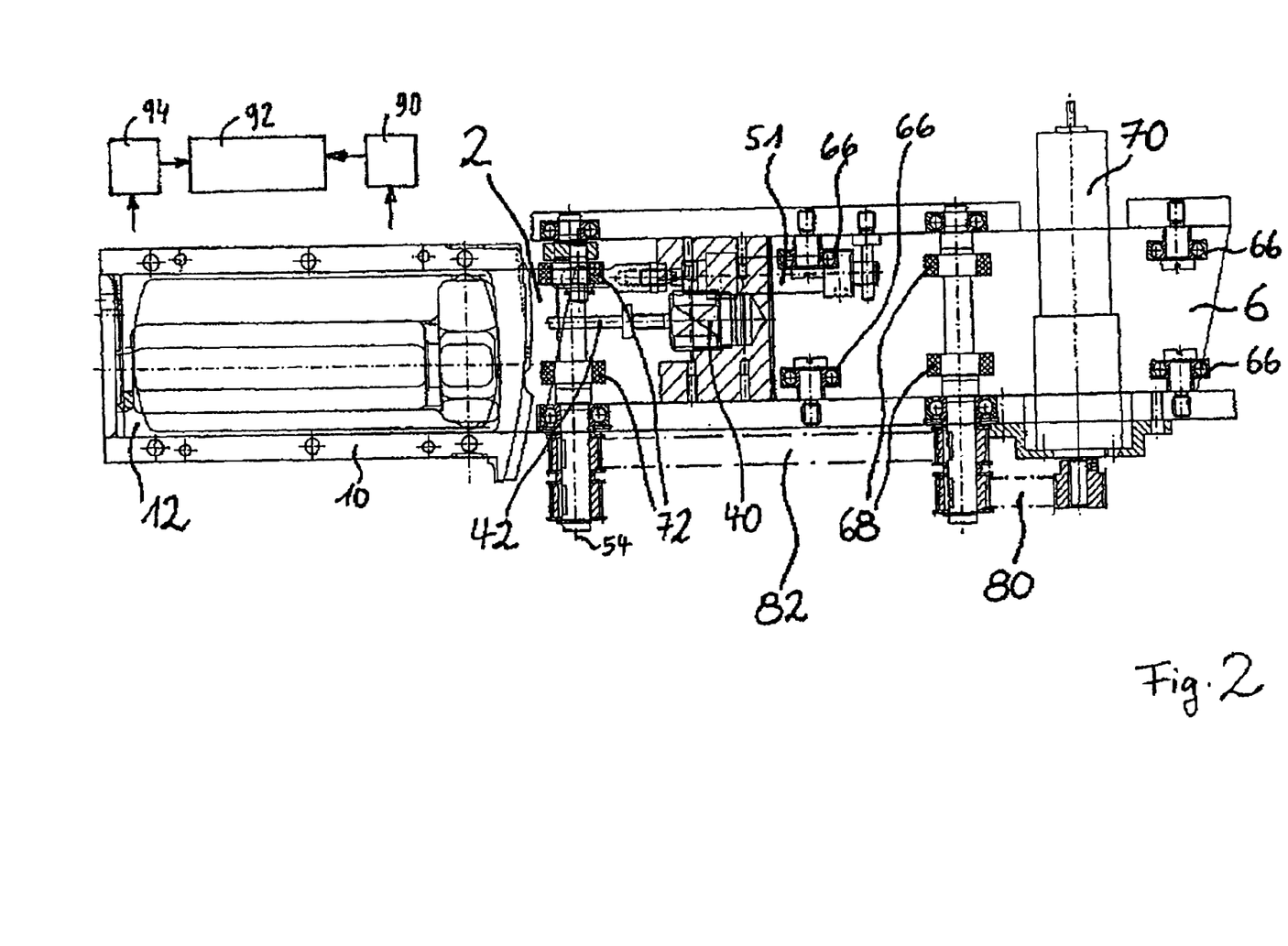
FIG. 2 is a partly elevational and partly vertical sectional view of the apparatus which is shown in FIG. 1.

The apparatus 1 which is shown in FIGS. 1 and 2 serves to replace successive first knives 2 with successive second or new or fresh knives. The knife 2 which is shown in FIGS. 1 and 2 is in use or is already spent (worn) to such an extent that it is advisable to replace it with a second knife 6. To this end, the apparatus 1 is designed to deactivate a locking device 16 which serves to releasably hold the knife 2 in the holder 4 of a cutting or severing unit 12 (hereinafter called cutoff). The later is assumed to be installed in or on the housing 10 of a cigarette rod making machine wherein the continuously produced cigarette rod advances lengthwise in a direction at right angles to the cutting edge 14 of the knife 2 and at right angles to the plane of FIG. 1. Upon removal from the holder 4, the knife 2 is delivered to a collecting station, e.g., to a scrap gathering unit (not shown), and is replaced with the foremost fresh knife 6 which must be withdrawn from a storage facility 8.

The cutoff 12 comprises a drum 11 which is driven to rotate at a high speed related to the speed of forward movement of the continuous cigarette rod in such a way that the rod is subdivided into a file of successive coaxial plain cigarettes of say double unit length. Suitable cutoffs are disclosed, for example, in U.S. Pat. No. 3,140,632 (granted Jul. 14, 1964 to Rowlands et al.), U.S. Pat. No. 3,476,002 (granted Nov. 4, 1969 to Bardenhagen et al.), U.S. Pat. No. 3,815,460 (granted Jun. 11, 1974 to Bardenhagen) and U.S. Pat. No. 3,830,126 (granted Aug. 20, 1974 to Ringe), as well as in German patent No. 38 35 314 C2.

The locking device 16 comprises a roller 18 movable between a first position in which it biases the knife 2 against the holder 4, and a second position in which the knife 2 is removable from the holder preparatory to introduction of a fresh knife. The shaft 20 of the roller 18 is guided in a channel 24 which extends at an acute angle to the surface 22 of the knife; this shaft is biased by a prestressed spring 26 which serves to urge the shaft 20 in a direction to bias the roller 18 against the surface 22 of the knife 2. Thus, the knife 2 is clamped between the roller 18 and a second roller 28 which serves as a stationary stop and is operatively connected with a feed screw 31 by an angular drive 29. When the feed screw 31 is rotated, the roller 28 is caused to turn and to move the knife 2 relative to the holder 4 to an extent which is necessary to compensate for wear at the cutting edge 14 of the knife. This ensures that the cutting edge is maintained in an optimum position for repeatedly severing the running cigarette rod. The means for grinding (sharpening) the knife 2 is not shown in FIGS. 1 and 2.

The apparatus 1 cooperates with the severing unit 12; this apparatus comprises a base plate or support 30 which is secured to a portion 34 of the housing 10 of the cigarette maker by means of a plate-like connector 32. The connector 32 is movable (with the support 30) linearly along a straight path in directions which are indicated by the double-headed arrow 36. This arrow is further intended to represent a drive which is employed to move the parts 30, 32 in directions toward and away from the cutoff 12.

The support 30 of the apparatus 1 carries an unlocking or disengaging unit 38 which serves to effect a disengagement of the knife 2 from the holder 4, preferably at a time when the second (fresh) knife 6 is ready to be introduced into the knife holder 4. The unlocking unit 38 comprises a bolt-shaped displacing member 42 and a cylinder-and-piston unit 40 which is affixed (e.g., bolted) to the support 30 and serves to move the displacing member 42 relative to the holder 4. A guide 44 is provided to establish an at least substantially straight path for movements of the displacing member 42. The latter can be moved to a predetermined or preselected position in which it is located directly opposite an opening 46 in the surface 48 of the housing 10 for the severing unit 12. When it assumes its fully extended position, the member 42 can act upon the shaft 20 for the roller 18 in such a way that the roller 18 is urged against the knife 2 by overcoming the opposition of the spring 26, i.e., the shaft 20 is moved (rearwardly) in the channel 24 so that the knife 2 is no longer clamped between the rollers 18 and 28.

The apparatus 1 further comprises a unit 50 which serves as a means for removing or withdrawing the knife 2 from the holder 4. This removing unit includes a clamping lever 52 which is pivotable by a fluid-operated cylinder 51 to turn about the axis of a shaft 54. A side or surface 56 of the clamping lever 52 confronts the guide 44 and cooperates with this guide to clamp the cutting edge 14 of the knife 2 (see FIG. 1). Such clamping action is produced in response to outward movement of the piston rod of the cylinder 51 and the resulting pivoting of the clamping lever 52 of the withdrawing unit 50 about the axis of the shaft 54.

The support 30 further carries a conveyor 60 which serves as a transporting unit for introduction of a new knife 6 from the storage facility 8 into the knife holder 4. The storage facility 8 contains springs 62 (FIG. 1 shows coil springs) which urge the fresh knives 6 of a stack or another suitable accumulation of such knives against each other in that the springs bias a platform-like member 64. The latter urges the nearest knife 6 in a direction to maintain the foremost knife 6 of the stack in the storage facility 8 in contact with rotary back supports 66 (see particularly FIG. 2).

The conveyor 60 includes rollers 68 and 72 which can be driven by a prime mover 70 to advance the foremost knife 6 of a stack of such knives in the storage facility 8 toward the knife holder 4. The rollers 68 and 72 are rotatable about parallel axes and are respectively installed between a front set and a rear set of rotary back supports 66 and in front of the left-hand back supports.

The roller 72 is or can be driven by the prime mover 70 (e.g., an electric motor) which further serves to drive the composite roller 68. The distance between the axes of the rollers 68 and 72 is somewhat less than the length of a knife 2 or 6; this ensures that the knife 6 which is to be introduced into the holder 4 is continuously guided, i.e., all the way from the storage facility 8 to the point of its entry into the knife holder 4.

FIG. 2 shows numerous components of the cutoff 12 and of the knife changing apparatus 1, as well as two endless belts, bands or chains 80, 82 which respectively serve to transmit motion from the prime mover 70 to the rollers 68 and 72.

Figure 3:
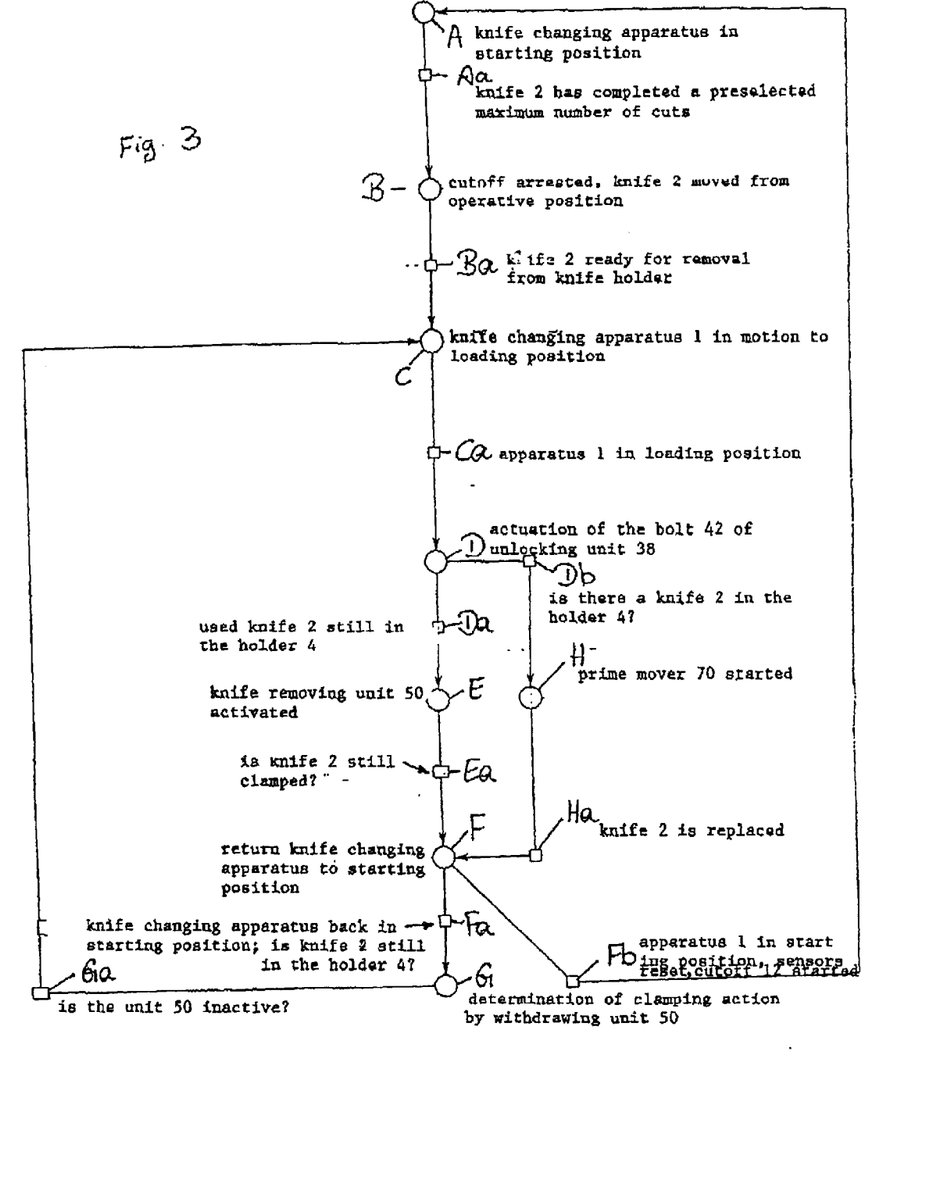
FIG. 3 is a flow diagram wherein the characters denote various steps of a series of steps in a method embodying one form of the invention.

The diagram of FIG. 3 is a pictorial representation of the steps which can be carried out in accordance with certain presently preferred embodiments of the improved method. The method includes the steps which are carried out in order to replace a worn or damaged or improperly selected first knife 2 (hereinafter called used knife) with a second knife 6 (hereinafter called new knife). The method is carried out by resorting to the combination of a cigarette making machine employing a cutoff 12 and a knife changing apparatus 1. The cigarette making machine can be of the type disclosed in U.S. Pat. No. 4,281,670 granted Aug. 4, 1981 to Heitmann et al. wherein FIG. 1 shows a cutoff 94. However, it is also possible to employ the apparatus 1 in combination with another machine which turns out one or more semifinished products (such as a continuous filter rod) and subdivides the semifinished product(s) into one or more files of discrete rod-shaped ultimate products such as filter mouthpieces of unit length or multiple unit length. Reference may be had to U.S. Pat. No. 4,412,505 granted Nov. 1, 1983 to Häusler et al. wherein a continuous filter rod containing a filter tow confined in a tubular wrapper is repeatedly severed by a cutoff 26.

The slogans which are utilized in the diagram of FIG. 3 are intended to facilitate the understanding of functions of various devices, instrumentalities, discrete parts and other constituents which are shown, at least in part, in FIGS. 1 and 2 and which are or which can be employed to carry out the steps of the improved method(s).

The step A denotes completion of movement of certain mobile parts of the conveyor 60 of the apparatus 1, and more particularly the (starting) positions such parts assume when the foremost new knife 6 of the stack in the storage facility 8 is remote from the knife holder 4 of the cutoff 12. A trailing or rear edge face 33 of the connector 32 abuts an end portion 35 of the housing 34 of the cigarette rod making machine including the cutoff 12.

Upon elapse of an interval between the step or assumption of condition denoted by A and the step or condition depicted at Aa, a sensor or counter 90 (FIG. 2) which is a part of or cooperates with a computerized control circuit 92 transmits to the latter a signal denoting that the extent of wear upon the cutting edge 14 of the knife 2 clamped in the holder 4 is sufficient to warrant replacement of such knife with a new knife 6. The sensor 90 can be designed to transmit to the control circuit 92 a signal when the number of incremental forward movements of the knife 2 in the holder 4 (in order to compensate for wear upon the cutting edge 14 of such knife) reaches a predetermined upper limit.

The next step (shown at B and caused by the control circuit 92 in response to a signal from the sensor 90) involves a movement (see the arrow 36) of certain parts of the apparatus 1 from starting positions to positions in which the new knife 6 is delivered linearly into close proximity of the cutoff 12 (this is the knife detecting position of such mobile parts of the conveyor 60). The sensor 90 (e.g., a photoelectronic detector) can detect the used knife 2 in the holder 4. Thus, the sensor 90 can count the number of successive incremental advances of the knife 2 as well as or actually detect the knife 2 in the holder 4 upon advancement of such sensor to the knife holder.

The cutoff 12 is arrested (see the step B) in that angular position of the drum 11 for the used knife 2 in which this knife is maintained in or close to a predetermined angular position relative to the axis of the drum 11. The cigarette making machine including the cutoff 12 is arrested (step B) as soon as the used knife 2 reaches its predetermined position.

In the next step, the spent knife 2 is gradually (slowly) moved to a position which is an optimum position for the next-following steps of the method. Such optimum position of the spent knife 2 is indicated at Ba.

The mobile parts of the knife changing apparatus 1 thereupon renew their movement in the direction of the arrow 36 to assume (at C) loading or transfer positions close to the used knife 2. At such time, the connector 32 and the aparatus 1 are located in the (loading or transferring) positions shows in FIG. 1 (step Ca in the diagram of FIG. 3).

The next step (D) involves an activation of the cylinder-and-piston unit 40 so that the bolt 42 releases the knife 2 by causing a disengagement of the locking device 16. This is achieved by moving the roller 18 away from the roll 28. The next step (Da) involves the generation (by the sensor 90 or by a discrete second sensor) of a signal denoting that the knife 2 is still in the holder 4.

The character E denotes the step of activating the removing unit 50 which then causes the surface 56 of the lever 52 and the guide 44 of the unlocking unit 38 to clamp the knife 2. The sensor 90 or an additional sensor can be utilized (see the step Ea) to ascertain whether or not the knife 2 is still clamped. If the answer is in the affirmative, the next-following step (F) involves a return movement of the apparatus 1 to its starting or retracted position, i.e., to a position remote from the cutoff 12.

The step denoted by the symbol Fa indicates a determination whether or not the apparatus 1 has reassumed its starting position and the knife 2 is still held in the holder 4. The next-following step G then involves a determination of clamping action by the withdrawing unit 50. The step Ga includes ascertaining whether or not the unit 50 is inactive. In the next step, the conveyor 68 (and particularly its transporting roller 72) advances the knife 2 through a short distance toward the cutoff 12 so that it can leave the apparatus. A further sensor (such as the sensor 94 shown in FIG. 1) can be employed to ascertain and to preferably indicate whether or not the spent knife 2 has left the apparatus 1.

If the answer denoted by the signal from the sensor 94 is in the affirmative, the apparatus 1 carries out the step C, i.e., it reassumes the position close to the cutoff 12 to deliver the foremost new knife 6 into the holder 4 (see FIG. 1). The step Ca (which follows the step C) follows a determination whether or not the apparatus 1 is actually held in the loading position. The roll 18 is thereupon actuated by the bolt 42 to open (step D) the holder 4 for entry of the fresh knife 6.

The next step (Db) involves a determination (by the sensor 90 or 94 or a further sensor) whether or not a knife is then located in the holder 4. The bolt 42 continues to hold the roller 18 in the idle position, and the next step (shown at H) includes starting the prime mover 70 to drive the rollers 68 and 72, i.e., to move the fresh knife 6 from the storage facility and entirely into the empty holder 4.

The step Ha involves the utilization of a sensor (i.e., of the sensor 90 or 94 or a further sensor) to ascertain whether or not the new knife 6 is properly received in the holder 4. If the answer is in the affirmative, the next step (Fb) involves a return (renewed) movement of the apparatus 1 to its starting position A, the sensor 90 is reset to zero, the sensor which monitors the evacuation of used knife 2 from the cutoff 12 is also reset to zero, and the cigarette making machine and its cutoff 12 are restarted.

The new knife 6 is preferably inserted into the holder 4 in such a way that the sharpening or grinding unit for the cutting edge of such knife is immediately ready to undergo the necessary sharpening treatment at a rate corresponding to the extent of wear when the cutoff 12 is in use.

An important advantage of the improved method is that one or more steps can be performed automatically. This contributes significantly to savings in workers' time and renders it possible to carry out all or all important or all tedious or all time-consuming operations or steps by resorting to automated equipment. As already mentioned hereinbefore, savings in time in connection with the retooling or refitting of cutoffs are particularly important when a plant employing numerous cigarette making, filter rod making or analogous machines must be equipped with fresh cutting implements at frequent intervals such as upon completion of each eight-hour shift.

It has been found that the improved apparatus can be automated to such an extent that spent (used) knives can be replaced with new knives without necessitating any work by the attendants. In fact, a single attendant can supervise the operation of entire batteries of cigarette making and analogous machines, at least insofar as the replacement of used knives is concerned. Such single attendant is called upon to interfere only and alone in the event of a malfunction or another unforeseen occurrence.

A step which is presently considered as being particularly important in connection with the automation of knife changes is that of automatically unlocking a knife 2 which is installed in the holder 4. Another important step is that which involves automatic positioning of the foremost new knife 6 for transport toward and for holding at the cutoff 12 prior to removal of the used knife. The locking device 16 can be used to lock a knife 2 in the holder 4 as well as to lock each following knife 6 in such holder. It has been ascertained that the automation of operation of the locking device 16 contributes significantly to facilitation of automation of numerous or all other steps including monitoring the condition of the knife 2 in the holder 4, disengaging the locking device 16, withdrawing a spent knife 2 from the opened holder 4, introducing a new knife 6 into the holder 4, and thereupon locking (such as clamping) the newly introduced knife 2 in the holder.

An advantage of the feature that the withdrawing unit 50 is set up to engage the cutting edge 14 of a knife prior to withdrawal of such (spent) knife from the holder 4 is that the cutting edge of such knife is or can be expected to be readily available from the outside for clamping and extraction from the holder.

The feature that a knife is maintained in a first predetermined position when the cutoff is brought to a halt, and that the knife is thereupon slowly moved to a second predetermined position is of particular advantage in machines (such as cigarette makers) which are designed to turn out huge quantities of discrete rod-shaped products per unit of time. Thus, the knife 2 in the cutoff 12 of a cigarette maker is decelerated from the normal operating speed to a much lower speed in the first step, and the knife is thereupon brought to a complete stop in the next-following step. When the knife 2 is brought to a halt, it is in an optimum position for extraction from the holder 4 by the withdrawing unit 50.

An advantage of the feature that the extent of wear upon the knife 2 in the holder 4 is monitored (directly by ascertaining the condition of the cutting edge 14 and/or indirectly by monitoring the number of severing operations being carried out by the knife) is that a knife is discarded only when it is no longer satisfactory for acceptable severing of cigarette rods, filter rods and the like. The simplest presently known monitoring device for the condition of a knife in the knife holder of a cutoff in a cigarette maker is a revolution counter which ascertains the number of revolutions of the drum 11 or of the knife in its holder or of any other rotary part of the cutoff.

The conveyor 60 exhibits the important advantage that it can enter a new knife 6 into the knife holder 4 in several stages. This ensures that the foremost new knife can be moved close to the cutoff while the previous knife (2) is still in use, and that the final stage of transfer of the new knife into the holder 4 can take place with little loss in time and as soon as the used knife is evacuated by the withdrawing unit 50. The first stage of movement of a new knife 6 from the storage facility 8 is or can be carried out by moving the knife 6 along a linear or at least substantially straight path. Such first stage of movement is preferably terminated when the new knife is in close or immediate proximity to the cutoff 12, as long as it does not interfere with withdrawal and evacuation of the used knife. The two (or more) stages of conveying a new knife 6 to the holder 4 can be carried out immediately after each other so that such introduction of the new knife into the holder takes up a suprisingly short interval of time.

The second stage of movement of a new knife 6 toward the holder 4 can be carried out at a speed which is less or much less than the speed of the first stage of such movement; this contributes to greater accuracy of positioning of the new knife prior to actual introduction into the cutoff 12. Moreover, such selection of the speeds of first and second stages of conveying of a new knife to the holder 4 renders it possible to take into consideration the elevated speeds of rotary knives in cigarette making and analogous mass-producing machines or production lines for the making of smokers' products. In accordance with a presently preferred embodiment, the holder 4 remains open from the instant of initial withdrawal of a used knife 2 (i.e., from the instant of deactivation of the locking device 16) to the instant of insertion of the new knife into and of its locking in the knife holder. Also, the position of the knife holder with reference to the stationary part or parts of the cutoff 12 need not be changed for withdrawal of a used knife and/or for subsequent insertion of a new knife.

It is presently preferred to employ the unlocking device 38 in connection with manipulation of the locking device 16 to release a used knife as well as to lock a new knife in the knife holder. This contributes to significant savings in space requirements and initial and maintenance cost of the apparatus 1.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of replacing knives and/or other cutting implements in cut-offs and other severing machines and, therefore, such adaptations should and are intended to be comprehended within the meaning and range of equivalence of the appended claims.

What is claimed is:

1. A method of replacing an at least partially spent first knife having a cutting edge, which is locked in the knife holder of a severing unit that is operative to sever smokers' products, with a second knife, comprising the steps of:
   automatically unlocking the first knife;
   removing the first knife from the holder by grasping the cutting edge of the first knife; and
   introducing the second knife to the holder,
   engaging the first knife prior to said removing step, said removing step including advancing the first knife along an at least substantially straight path and further comprising the step of delivering the removed first knife to and releasing the first knife on a disposing station for spent knives.

2. The method of claim 1, wherein said engaging step is carried out prior to said unlocking step.

3. The method of claim 1, further comprising the step of moving the first knife to a predetermined position relative to the holder subsequent to said unlocking step and prior to completion of said removing step.

4. The method of claim 3, wherein said removing step includes placing a withdrawing unit for the first knife opposite the first knife not later than when the first knife occupies said predetermined position.

5. The method of claim 1, further comprising the step of interrupting the operation of the severing unit at least in the course of said removing step.

6. The method of claim 5, further comprising the step of maintaining the first knife at least close to a predetermined position at the time of initiation of said removing step.

7. The method of claim 6, wherein said removing step includes placing a withdrawing unit for the first knife opposite the first knife not later than when the first knife occupies said predetermined position.

8. The method of claim 1 of replacing a first knife which is subject to wear during operation of the severing unit, further comprising the steps of monitoring the extent of wear upon the first knife during operation of the severing unit and initiating said removing step when the wear upon the first knife reaches a predetermined value.

9. The method of claim 1, further comprising the step of automatically locking the second knife in the holder upon completion of said introducing step.

10. The method of claim 1, further comprising the steps of withdrawing the second knife from a storage facility for second knives and conveying the thus withdrawn second knife to a preselected position prior to said introducing step.

11. The method of claim 10, wherein said conveying step includes moving the second knife along an at least partially linear path.

12. The method of claim 10, wherein said conveying step includes moving the second knife along an at least substantially linear path.

13. The method of claim 10, further comprising the step of transporting the knife holder to a position opposite said preselected position of the second knife prior to said introducing step.

14. The method of claim 1, wherein the operation of the severing unit includes moving the knife holder and further comprising the step of interrupting the moving step preparatory to and in the course of said introducing step.

15. The method of claim 14, further comprising the steps of withdrawing the second knife from a storage facility, conveying the thus withdrawn second knife to a preselected position prior to said introducing step, and transporting the knife holder to a position opposite the second knife in the preselected position of the second knife.

16. The method of claim 1, further comprising the step of locking the second knife in the knife holder upon completion of said introducing step.

17. The method of claim 1, further comprising the step of maintaining, at the time of initiation of said removing step, the knife holder at least close to a predetermined position in which the second knife can be introduced into the knife holder upon completion of said removing step.

18. The method of claim 1, further comprising the step of automatically carrying out at least one of said removing and introducing steps.

19. The method of claim 18, wherein said step of automatically carrying out at least one of said removing and introducing steps is computerized.

20. The method of claim 1, further comprising the step of automatically locking the second knife in the holder upon completion of said introducing step.

21. The method of claim 1, further comprising the step of automatically carrying out at least one of additional steps including:

- moving the first knife to a predetermined position relative to the holder subsequent to said unlocking step and prior to completion of said removing step,
- interrupting the operation of the severing unit at least in the course of said removing step,
- maintaining the first knife at least close to a predetermined position at the time of initiation of said removing step,
- monitoring the extent of wear upon the first knife during operation of the severing unit, initiating the removing step when the wear upon the first knife reaches a predetermined value,
- locking the second knife in the holder upon completion of said introducing step,
- withdrawing the second knife from a storage facility for second knives,
- conveying the withdrawn second knife to a predetermined position prior to said introducing step,
- transporting the knife holder to a position opposite a preselected position of the second knife prior to said introducing step,
- moving the knife holder during operation of the severing unit,
- interrupting the movement of the knife holder preparatory to and in the course of said introducing step, and
- maintaining—at the time of initiation of said removing step—the knife holder at least close to a predetermined position in which the second knife can be introduced into the knife holder upon completion of said removing step.

22. Apparatus for replacing a first knife, which is locked in a knife holder of a severing unit in machine for severing partly finished smokers' products, with a second knife, comprising:

- disengageable means for locking the first knife in the holder;
- means for disengaging said locking means;
- means for removing the first knife from the holder upon disengagement of said locking means; and
- means for introducing the a second knife into the holder upon removal of the first knife prior to reengagement of the locking mean,
- wherein said locking mean comprises a biasing member movable between first and second positions in which a knife is respectively locked in and removable from the holder, said disengaging means comprising a displacing member and means for moving said displacing member relative to the holder to thus move said biasing member from said first to said second position thereof at least during removal of the first knife from the holder, and
- wherein said biasing member comprises at least one roller and said displacing member comprises a reciprocable bolt.

23. The apparatus of claim 22, wherein said removing means includes means for clamping the first knife at least during removal of the first knife from the holder.

24. The apparatus of claim 22 for replacing a first knife having a cutting edge, wherein said removing means comprises means for clamping the cutting edge of the first knife during removal of the first knife from the holder.

25. The apparatus of claim 24, wherein said removing means further comprises means for moving said clamping means and the first knife along an at least partially linear path extending away from the holder.

26. The apparatus of claim 22, further comprising means for engaging said locking means upon introduction of the second knife into the holder.

27. The apparatus of claim 26, wherein said engaging means includes said disengaging means.

28. The apparatus of claim 22, wherein said locking means comprises means for conveying the second knife into the holder in the second position of said biasing member and upon removal of the first knife from the holder.

29. The apparatus of claim 28, further comprising a storage facility for a supply of second knives, said conveying means being arranged to move discrete second knives seriatim from said storage facility to the holder.

30. The apparatus of claim 29, wherein said conveying means comprises driven rollers arranged to advance second knives from said storage facility to the holder.

31. The apparatus of claim 29, wherein said storage facility comprises resilient means for biasing second knives of the supply against each other.

32. The apparatus of claim 22, wherein said disengaging means includes means for releasably locking a second knife in the holder upon introduction of such second knife into the holder.

* * * * *